Patented Sept. 19, 1950

2,523,235

UNITED STATES PATENT OFFICE 2,523,235

VULCANIZABLE CEMENT COMPOSITION

John H. Reilly, Midland, Mich., assignor to The Dow Chemical Company, Midland, Mich., a corporation of Delaware No Drawing. Application April 13, 1949, Serial No. 87,341

4 Claims. (Cl. 260—41)

This invention relates to a vulcanizable composition which is particularly useful as a cement or adhesive.

Most "rubber" products now available are made either of natural rubber or of a synthetic cross-linked copolymer of a diene hydrocarbon with one or more singly unsaturated monomers. A newer group of vulcanizable materials contains no diene type of cross-linking agent in its structure, and, being normally thermoplastic, would not be classed ordinarily as a "rubber." Yet, when the latter copolymers are mixed and heated with some vulcanizers and accelerators, they may become as truly vulcanized, infusible and non-plastic as any of the typical vulcanized rubbers. It is reported by Reuter, in U. S. Patent 2,451,174, that polymers and copolymers generally of vinyl and vinylidene halides are vulcanizable when heated with polymerized trimethyl dihydroquinoline, or with cinchona alkaloids, or with aliphatic polyamines.

When polymeric vinyl or vinylidene halides are vulcanized, as above described, they have not only the infusibility which results from vulcanization but also an increased resistance to attack by solvents, oils or many chemicals. Their extreme inertness makes it desirable to use these vulcanized polymers as tank linings and for similar protective purposes, as, for example, in chemical and petroleum plant equipment. The problem has been to find a means for causing adherence between the polymer sheet and other surfaces, and the problem becomes far more acute when the polymer is in the vulcanized condition. The usual rubber cements, containing natural or synthetic diene polymers or copolymers, do not form a satisfactory bond with vinyl or vinylidene halide polymer sheets, or with many other polymers or rubbers, whether vulcanized or not. An adhesive is required which will create a permanent bond between a vinyl or vinylidene halide polymer sheet or between other polymeric or rubber sheets and any of such diverse surfaces as: other such sheets; metal surfaces; hydrocarbon rubber surfaces; cloth, wood, stone or ceramic surfaces; and the like. The term "permanent bond" is intended herein to mean a degree of adhesion so nearly perfect that one or the other of the cemented sheets will fail, under stress, before the polymer layer will separate from the attached or supporting surface.

It is the object of this invention to provide a cement composition which is vulcanizable and which will serve to effect a permanent bond between vinyl or vinylidene halide polymer or copolymer sheets, whether the latter are vulcanized or not, and any of such diverse surfaces as are enumerated above. A particular object is to provide a vulcanizable adhesive capable of effecting a permanent bond between a vulcanized or vulcanizable rubber or polymeric sheet material, such as vinyl or vinylidene halide polymer or copolymer sheet, and the internal walls of a metal tank. Other and related objects may become apparent as the description of the invention proceeds.

The adhesive of the invention consists of a particular vinylidene chloride-acrylonitrile copolymer composition to be defined hereinafter, either in the form of a solution thereof in an active solvent, or in the form of dry sheets or strips. When used as a solution, best results are obtained by applying a coat of the liquid to one or both of the surfaces to be joined, letting the solvent evaporate until the deposited coat is no longer tacky, repeating the process one or more times, if desired, until enough of the adhesive layer has been built up, applying acetone or like solvent to the rubber surface to tackify it and letting the solvent evaporate until the surface appears dry, then bringing into contact the surfaces to be joined, and applying heat and pressure until the adhesive has become cured. When lining metal tanks, the adhesive is most conveniently built up on the metal surface, after which the polymer sheet is pressed into position and then the bond may be established while vulcanizing the adhesive, by filling the tank with hot water which may contain a small amount of ammonia. When the adhesive is used in dry sheet or strip form, it is simply placed between the surfaces to be joined, and the latter are heated under pressure for a time and at a temperature to cure the adhesive.

The composition which has been found useful in the present invention has two essential constituents and may have any of several optional constituents, each of which may contribute valuable properties to the adhesive for specific purposes. The essential parts of the adhesive composition are (1) a copolymer of 85 to 92 per cent vinylidene chloride and 15 to 8 per cent acrylonitrile and (2) from 4 to 8 parts of tetraethyl or tetramethyl thiuram disulfide for each 100 parts by weight of copolymer. To improve the adhesive action of the cement on steel, it has been found especially advantageous to include therein from 3 to 15 parts of anhydrous copper sulfate per 100 parts of copolymer. Other, and optional constituents include reinforcing carbon, lead oxide or other activator, a plasticizer for the polymer to assist in working the composition before it is vulcanized, and such secondary vulcanizing agents and accelerators as elemental tellurium and aniline-butyraldehyde condensates. In preparing the composition, the copolymer and the tetraalkyl thiuram disulfide, together with any carbon black, lead oxide and plasticizer, are thoroughly mixed on a hot mill and then sheeted from the mill in a form resembling well milled natural rubber. This sheet may be dissolved to form a solution in methyl ethyl ketone or methyl isobutyl ketone, and used in the manner previously outlined. Solutions of about 30 per cent concentration are most practical. The necessary adhesive qualities of the composition are lost entirely when the copolymer contains materially less than 8 per cent acrylonitrile (over 92 per cent vinylidene chloride), and the bond obtained is inferior when the copolymer contains much over 15 per cent acrylonitrile. Copolymers of vinylidene chloride with such other materials as vinyl chloride or acetate or acrylic acid esters have not been found satisfactory ingredients in adhesive compositions of the type here concerned.

In a specific example, 100 pounds of a copolymer of 88 per cent vinylidene chloride and 12 per cent acrylonitrile, 30 pounds of a reinforcing carbon black, 4 pounds of lead oxide and 30 pounds of diethylene glycol dipropionate (plasticizer) were mixed on a hot mill at 150° C. and then cooled and broken down on the mill. To this composition was added 6 pounds of tetraethyl thiuram disulfide, which was thoroughly mixed into the composition. About 20 pounds of magnesium oxide was mixed into the composition, which was then sheeted from the mill at a thickness of about 0.03 inch. A solution was made from 30 pounds of the sheet composition and 70 pounds of methyl ethyl ketone. A steel storage tank, internally sand-blasted to remove scale and rust and to present a clean metal surface, was coated successively on its inner surface with three coats of the described composition. Each coat was allowed to dry to a tack-free condition before the next was applied. A synthetic rubber sheet, made from a vinylidene chloride copolymer as described in my copending application Serial No. 611,703, filed August 20, 1945, was moistened with methyl ethyl ketone to tackify its surface. When this sheet appeared to be nearly dry, it was pressed against the adhesive-coated steel, and, after the whole inner surface of the tank had been coated in like manner, the tank was filled with water containing about 0.1 to 0.5 per cent ammonia. (The ammonia aided in curing the polymer sheet, but had no effect on the present adhesive.) The water was at a temperature of 70° C. and this temperature was maintained for 24 hours. When the tank was emptied, it was found to have a tightly adherent synthetic rubber lining. When samples of the so-lined steel were tested for the quality of the bond between the rubber and the steel, the adhesive bond was found to be stronger than the adherent rubber sheet. When, in an otherwise identical operation, the magnesium oxide was omitted and 10 pounds of anhydrous copper sulfate was used instead, examination showed that the adhesive bond was even stronger and was more uniform than the one reported above.

In another example, an adhesive composition was prepared in the manner described above, but without the magnesium oxide or copper sulfate. A solution was prepared in methyl isobutyl ketone, and this solution was spread on a cotton fabric which it was desired to bond to a rubber sheet. Two successive layers of the adhesive were applied, the first being allowed to dry to a tack-free condition before the second was added. The sheet of rubber stock was moistened with acetone to soften its surface and, when this surface began to feel dry, the coated cloth was spread over the rubber, with the adhesive layer next to the rubber. When the cloth was freed from wrinkles, the assembly was placed between platens of a heated press, and was heated at 130° C. for 15 minutes under a nominal pressure of 100 pounds per square inch. The so-coated article was found to be stronger at the vulcanized bond than in either the cloth or the rubber layers. When it is possible, as in the last example, to press cure the whole assembly, it is generally advantageous to use a sheet of the milled adhesive in dry form rather than to employ the solutions whose use has been described. Curing times are found to vary inversely as the temperature and directly with the thickness of the assembly. A cure at 130° C. for 10 to 20 minutes is generally sufficient, while at 50° C. a period of 48 hours may be required.

In like manner to those described above, similar compositions have been and may be used to coat paper, cloth, rubber, wood, masonry or metal and to bond such materials to other such materials, whether or not the latter have been coated similarly.

I claim:

1. A vulcanizable adhesive composition, the essential and intimately mixed constituents of which are (1) a copolymer of from 85 to 92 per cent vinylidene chloride and complementarily from 15 to 8 per cent acrylonitrile and (2) from 4 to 8 parts of a tetraalkyl thiuram disulfide for each 100 parts of the copolymer.

2. A vulcanizable adhesive composition, the essential and intimately mixed constituents of which are (1) a copolymer of from 85 to 92 per cent vinylidene chloride and complementarily from 15 to 8 per cent acrylonitrile and (2) from 4 to 8 parts of a tetraalkyl thiuram disulfide for each 100 parts of the copolymer, and the intimately admixed auxiliary constituents of which comprise a plasticizer for the copolymer, a reinforcing carbon black, and lead oxide in proportions, respectively, to facilitate mixing the constituents, to strengthen the product when vulcanized, and to activate the vulcanizer when heated.

3. A vulcanizable adhesive composition, the essential and intimately mixed constituents of which are (1) a copolymer of from 85 to 92 per cent vinylidene chloride and complementarily from 15 to 8 per cent acrylonitrile and (2) from 4 to 8 parts of a tetraalkyl thiuram disulfide for each 100 parts of the copolymer, the said composition containing also from 3 to 15 parts of anhydrous copper sulfate for each 100 parts of the copolymer to improve the adherence of the composition to steel.

4. A vulcanizable adhesive composition, the essential and intimately mixed constituents of which are (1) a copolymer of from 85 to 92 per cent vinylidene chloride and complementarily from 15 to 8 per cent acrylonitrile and (2) from 4 to 8 parts of a tetraalkyl thiuram disulfide for each 100 parts of the copolymer, and the intimately admixed auxiliary constituents of which comprise a plasticizer for the copolymer, a reinforcing carbon black, anhydrous copper sulfate, and lead oxide in proportions, respectively, to facilitate mixing the constituents, to strengthen the product when vulcanized, to improve the adherence of the composition to steel, and to activate the vulcanizer when heated.

JOHN H. REILLY.

REFERENCES CITED

The following references are of record in the file of this patent:

UNITED STATES PATENTS

| Number | Name | Date |
|---|---|---|
| 2,416,878 | Lindsey et al. | Mar. 4, 1947 |